(12) United States Patent
Helfman et al.

(10) Patent No.: US 7,705,847 B2
(45) Date of Patent: Apr. 27, 2010

(54) GRAPH SELECTION METHOD

(75) Inventors: Jonathan Helfman, Half Moon Bay, CA (US); Joseph H. Goldberg, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 447 days.

(21) Appl. No.: 11/682,010

(22) Filed: Mar. 5, 2007

(65) Prior Publication Data

US 2008/0222562 A1 Sep. 11, 2008

(51) Int. Cl.
*G06T 11/20* (2006.01)
(52) U.S. Cl. .................... 345/440; 345/440.2
(58) Field of Classification Search ....... 345/440–440.2
See application file for complete search history.

(56) References Cited

U.S. PATENT DOCUMENTS

| | | | | |
|---|---|---|---|---|
| 5,461,708 A * | 10/1995 | Kahn | ......................... | 345/440 |
| 5,550,964 A * | 8/1996 | Davoust | ..................... | 345/440 |
| 5,557,716 A * | 9/1996 | Oka et al. | ................... | 345/440 |
| 5,581,677 A * | 12/1996 | Myers et al. | ................. | 345/440 |
| 5,581,678 A * | 12/1996 | Kahn | ......................... | 345/440 |
| 5,611,034 A * | 3/1997 | Makita | ....................... | 345/440 |
| 5,713,031 A * | 1/1998 | Saito | ....................... | 707/104.1 |
| 5,774,118 A * | 6/1998 | Hatakama | .................. | 715/707 |
| 5,844,558 A * | 12/1998 | Kumar et al. | ............ | 345/440.2 |
| 6,972,763 B1 * | 12/2005 | Millett et al. | ............... | 345/440 |
| 6,995,768 B2 * | 2/2006 | Jou et al. | .................... | 345/440 |
| 7,002,580 B1 * | 2/2006 | Aggala et al. | ............... | 345/440 |
| 7,071,940 B2 * | 7/2006 | Malik | .......................... | 345/440 |

OTHER PUBLICATIONS

Tarrani et al., Tools for IT Professionals and Consultants—How to Select a Chart Type that Best Displays Your Numerical or Statistical Data, www.geocities.com/TechCommLCZ/ChartSelection.pdf (Internet Archive), accessed Dec. 21, 2004.*
Few, Stephen, "Information Dashboard Design," O'Reilly Media, 2006, pp. 130-139.

(Continued)

*Primary Examiner*—Xiao M Wu
*Assistant Examiner*—Charles Tseng
(74) *Attorney, Agent, or Firm*—Townsend and Townsend and Crew LLP

(57) ABSTRACT

Embodiments of the present invention provide a decision framework for selecting graph types based on attributes such as task, end-user, data-bound, and representational attributes. According to one embodiment, a computer-implemented method for aiding a user in selecting a graph type for a graph comprises receiving a selection of a graph type subset from the user, the graph type subset selected from a plurality of graph type subsets, the selection responsive to at least one task attribute corresponding to an intended use for the graph. The method further comprises generating a user interface to be displayed to the user, the user interface including an indication of at least one graph type in the selected graph type subset, an indication of at least one attribute, and an indication of whether the at least one graph type is appropriate in view of the at least one attribute, thereby providing guidance to the user in selecting an appropriate graph type.

12 Claims, 12 Drawing Sheets

OTHER PUBLICATIONS

Gillan, Douglas, et al., "Guidelines for Presenting Quantitative Data in HFES Publications," *Human Factors*, vol. 40, No. 1, Mar. 1998, pp. 28-41.

Harris, Robert L., "Information Graphics: A Comprehensive Illustrated Reference," Oxford University Press, 2000, pp. 164-177.

Huynh, David, et al., "Piggy Bank: Experience the Semantic Web Inside Your Web Browser," *International Semantic Web Conference (ISWC)* 2005.

Lin, James and Landay, James, "Damask: A Tool for Early-Stage Design and Prototyping of Cross-Device User Interfaces," In Proceedings of *The 8th International Conference on Distributed Multimedia Systems (2002 International Workshop on Visual Computing)*, San Francisco, CA, Sep. 26-28, 2002, pp. 573-580.

Bertin, Jacques, "Semiology of Graphics, *Diagrams Networks Maps*," Univ. of Wisconsin Press, 1983, pp. 15-283.

* cited by examiner

| Decision Attributes | Bar Graph | Horizontal Bar Graph | Clustered Bar Graph | Horizontal Clustered Bar Graph |
|---|---|---|---|---|
| Show quantities associated with one set of categories | Yes | Yes | No | No |
| Show time-based quantities associated with one set of categories | No | Yes | No | No |
| Show quantities associated with two or more sets of categories | No | No | Yes | Yes |
| Show time-based quantities associated with two or more sets of categories | No | No | No | Yes |

FIG. 3

GRAPH SELECTION METHOD

CROSS-REFERENCES TO RELATED APPLICATIONS

The present disclosure is related to the following commonly assigned U.S. patent application, which is incorporated herein by reference: application Ser. No. 11/681,986, now U.S. Publication No. 2008/0222561 A1, published on Sep. 11, 2008, filed Mar. 5, 2007, entitled "Generalized Faceted Browser Decision Support Tool."

BACKGROUND OF THE INVENTION

Embodiments of the present invention relate generally to decision support tools, and more particularly relate to a decision framework for selecting graph types.

Graphs, such as line graphs, bar graphs, pie charts, and the like, are effective tools for visualizing and understanding large quantities of data. However, choosing an appropriate graph type for a given situation can be a complex task. The selection of a graph type depends on many factors, including the types of data to be plotted and the kinds of tasks to be performed by end-users. Furthermore, there are hundreds of different graph types, each having a different effect on the types of insight that may be gained from the underlying data.

Prior publications by researchers in the field of information visualization expose the complexities of graph selection, but do not provide a step-by-step methodology for determining the most appropriate graph type for a particular scenario. Many researchers take a partial approach to helping users identify appropriate graph types by organizing graphs. A similar approach is taken by popular spreadsheet programs (e.g., Microsoft Excel) and other data analysis systems (e.g., SPSS). These attempts to organize graphs cluster them together according to various functional categorizations (e.g., data, form, geometry). For example, the "chart wizard" in Excel presents users with graph types organized by form (e.g., bar, pie, line, area, etc.), thereby allowing users to select a graph type based on a desired visual representation of the graph.

A problem with the above approaches is that each categorization restricts the manner in which users may locate appropriate graphs. For example, a data categorization may be useful for analysts with a clear understanding of the form of the data they need to display. A data categorization may be less useful for designers who are selecting a graph type from an end-user-based perspective.

A related problem is that most existing graphing tools such as Excel categorize graph types according to form-based characteristics. Current tools do not adequately account for the intended end-users of a graph, or the types of insight that those end-users are expected to gain. As a result, these tools may recommend graph types that are ultimately inappropriate for a given target audience or task.

BRIEF SUMMARY OF THE INVENTION

Embodiments of the present invention address the foregoing and other such problems by providing a decision framework for selecting graph types based on task and end-user (as well as data and representational) attributes. This task-based framework allows users to identify the most appropriate graph type for a given target audience and their associated tasks.

According one set of embodiments, a first decision table is presented in a user interface (e.g. web page, proprietary application window, etc.). The first decision table displays a plurality of graph type subsets (i.e., graph families) and associated task and/or end-user attributes. Exemplary task attributes include "compare trends," "show percentages," and "show totals." Exemplary end-user attributes include "casual," "experienced," and "experienced/frequent user." In various embodiments, a user selects a graph type subset from the first decision table based on an intended task or end-user role, thereby pruning unusable graphs from the decision space.

Once a graph type subset is selected, a second decision table is presented to the user. In an exemplary embodiment, the second decision table displays a list of task, data, end-user, and/or representational attributes, and indications of whether each graph type in the selected graph type subset is appropriate in view of each attribute. Using this information, users can identify appropriate graph types based on the attributes that are most relevant to their dataset, target audience, etc. The table format also enables users to visualize and understand the benefits and trade-offs of utilizing different graph types.

According to another set of embodiments, an automated or semi-automated graph selection method is provided. Specifically, a subset of recommended graph types is automatically generated based on attributes of the underlying dataset (e.g., number, types, and lengths of dimensions). This feature allows the decision space of graph types to be pruned without any user interaction. In various embodiments, the generated subset of graph types is presented in a decision table (such as the second decision table described above) to a user, thereby allowing manual selection of an appropriate graph type within the generated subset based on additional decision attributes.

Embodiments of the present invention may be particularly useful to large software companies that generate a wide range of disparate applications incorporating graphs. Using these embodiments will likely improve the consistency of those graphs, and enable software developers and product managers to make data visualization decisions that were formerly only reliably made by user interface designers.

Furthermore, the present solution will reduce the number of situations where software end-users are surprised by unusable and inappropriate graphical data representations. They will likely have more consistent graphical expectations within and across applications, enabling them to spend less time learning how to read an unfamiliar graph, and more time finding business-critical patterns in data.

Embodiments of the present invention may also be beneficial to news organizations, web media, financial companies, consulting firms, and others who have datasets that must be quickly, consistently, and efficiently represented in graphs.

According to one embodiment of the present invention, a computer-implemented method for aiding a user in selecting a graph type for a graph comprises receiving a selection of a graph type subset from the user, the graph type subset selected from a plurality of graph type subsets, the selection responsive to at least one task attribute corresponding to an intended use for the graph. The method further comprises generating a user interface to be displayed to the user, the user interface including an indication of at least one graph type in the selected graph type subset, an indication of at least one attribute, and an indication of whether the at least one graph type is appropriate in view of the at least one attribute, thereby providing guidance to the user in selecting an appropriate graph type.

According to another embodiment of the present invention, the at least one attribute described above is selected from a group consisting of: a data attribute corresponding to a dataset to be plotted in the graph, an end-user attribute corresponding to an intended end-user of the graph, a representational attribute corresponding to an intended visual representation of the graph, and a second task attribute corresponding to an intended use for the graph.

According to yet another embodiment of the present invention, the user interface further includes information about the at least one graph type.

According to another aspect of the present invention, a machine-readable medium for a computer system is enclosed. The machine-readable medium includes instructions which, when executed by a processor, cause the processor to receive a selection of a graph type subset from a user, the graph type subset selected from a plurality of graph type subsets, the selection responsive to at least one task attribute corresponding to an intended use for the graph. The instructions further cause the processor to generate a user interface to be displayed to the user, the user interface including an indication of at least one graph type in the selected graph type subset, an indication of at least one attribute, and an indication of whether the at least one graph type is appropriate in view of the at least one attribute, thereby providing guidance to the user in selecting an appropriate graph type.

According to yet another aspect of the present invention, a system for recommending a graph type for a graph comprises a data storage device and a server in communication with the data storage device. The data storage device is operable to store data for a plurality of graph type subsets, graph types, and attributes. The server is operable to receive a selection of a graph type subset, the graph type subset selected from the plurality of graph type subsets, the selection responsive to at least one task attribute corresponding to an intended use for the graph. The server is further operable to generate a user interface to be displayed to a user, the user interface including an indication of at least one graph type in the plurality of graph types, an indication of at least one attribute in the plurality of attributes, and an indication of whether the at least one graph type is appropriate in view of the at least one attribute, thereby providing guidance to the user in selecting an appropriate graph type.

A further understanding of the nature and the advantages of the inventions disclosed herein may be realized by reference to the remaining portions of the specification and the attached drawings.

BRIEF DESCRIPTION OF THE DRAWINGS

Various embodiments in accordance with the present invention will be described with reference to the drawings, in which:

FIG. 3 illustrates a second exemplary decision table in accordance with one embodiment of the present invention;

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention relate to methods, systems, and machine-readable media that provide a graph selection framework focused on end-users and their tasks. In various embodiments, a first decision table is provided that allows a user to filter the total set of possible graph types according to a relevant task and/or end-user attribute. A second decision table then presents the remaining graph types, along with an organized list of task, data, end-user, and representational attributes. Based on the responses to the list of attributes, one or more appropriate graph types may be identified.

Figure 1:
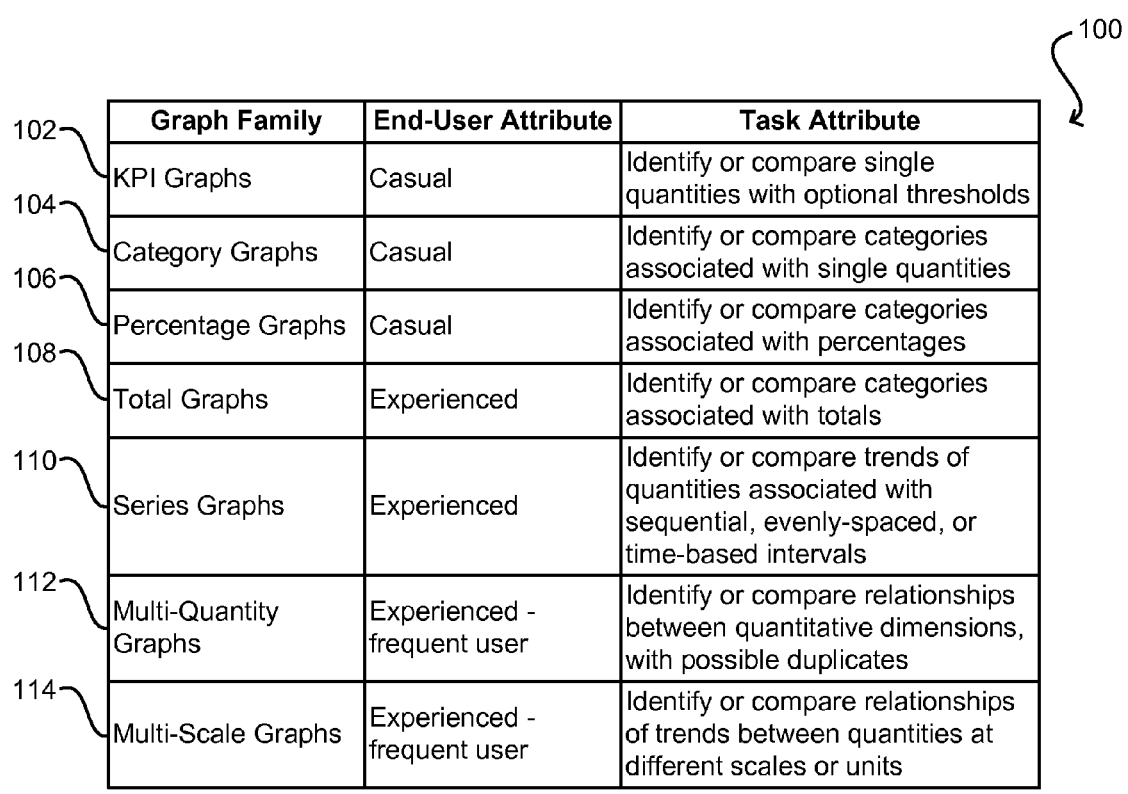
FIG. 1 illustrates a first exemplary decision table in accordance with one embodiment of the present invention.

FIG. 1 illustrates a first decision table 100 in accordance with one embodiment of the present invention. Decision table 100 may be presented in a computer-based user interface, such as a web page, proprietary application window, or any other type of software interface. Alternatively, decision table 100 may be presented in printed form. As shown, decision table 100 includes a plurality of graph type subsets, or families (102, 104, 106, 108, 110, 112, 114), and each subset is associated with an end-user and task attribute. For example, the graph family "KPI Graphs" (102) is associated with "casual" end-users, and may be used to perform the task of identifying or comparing quantities with optional thresholds. Using this initial table, users can quickly narrow down the decision space of possible graph types according to the experience level of their intended end-users and the tasks they are expected to perform.

Although the illustrative embodiment of FIG. 1 shows seven graph families, many other groups of graph types, such as Polar/Radar graphs and Stock Hi-Lo graphs, may be included. Furthermore, various combinations of end-user, task, and data attributes may be displayed. For example, decision table 100 may include an additional data attribute column that identifies the number and types of data dimensions that are supported by each graph family. Alternatively, decision table 100 may only display task or end-user attributes.

Figure 2:
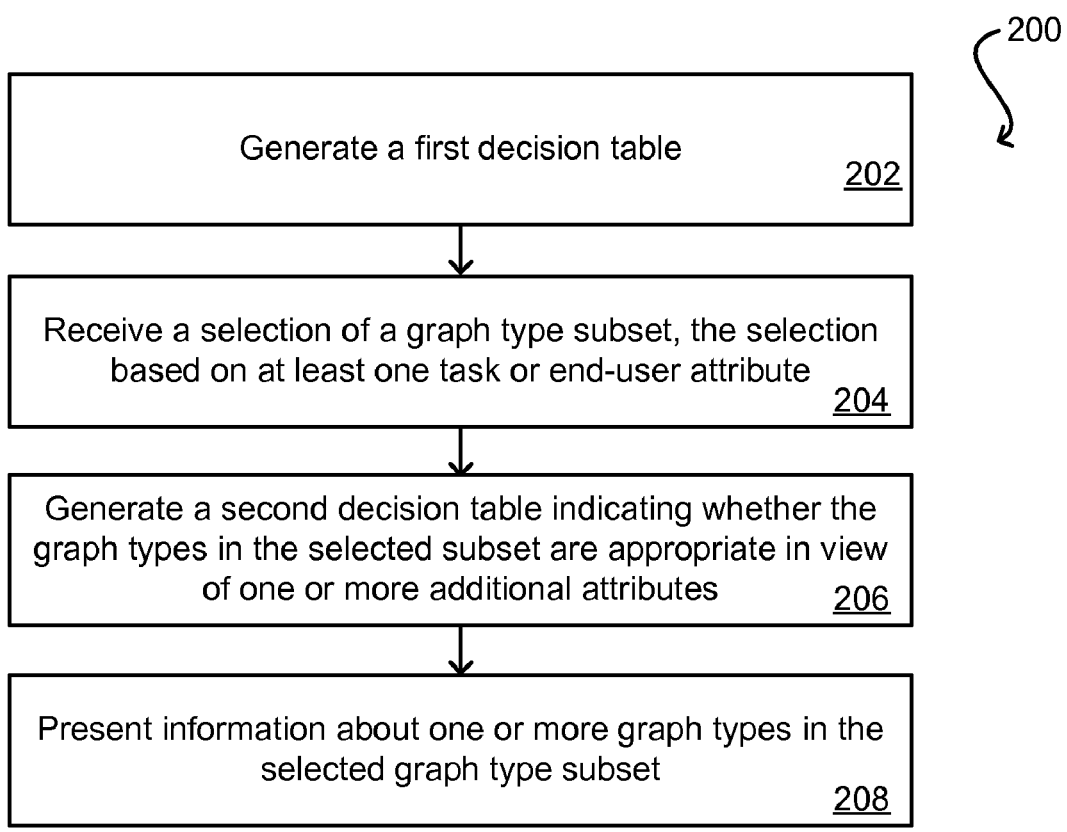
FIG. 2 illustrates the steps performed in selecting a graph type in accordance with one embodiment of the present invention.

FIG. 2 illustrates steps performed in selecting a graph type according to one embodiment of the present invention. At step 202, a first decision table (e.g., decision table 100) is generated. As described above, first decision table 100 lists a number of graph type subsets and associated end-user, task, and/or data attributes. At step 204, a selection of a graph type subset is received. In various embodiments, the selection is responsive to one or more of the end-user, task, or data attributes provided in the table. For example, with respect to table 100, a user searching for a graph type that allows identification of percentages would select the subset "Category Graphs" (104).

Based on the selected graph type subset, a second decision table is generated (206). The second decision table is used to aid the user in further narrowing down the decision space of possible graph types according to additional task, data, end-user, and/or representational attributes. In various embodiments, the second decision table displays the graph types in the selected subset along one axis and a list of attributes along the other axis. At the intersection of each row and column is an indication/response of whether the corresponding graph type is appropriate in view of the corresponding attribute. The combination of these indications/responses across the attributes provide guidance to the user in making an appropriate selection. The tabular format also allows the user to visualize the entire decision space of graph types, helping the user understand the strengths and weakness of each graph type.

At step 208, detailed information about the graph types in the selected subset is provided. This information may help users in recognizing the graphs types presented in the second decision table, and understanding how to implement each graph type. In various embodiments, the detailed information is generated and displayed concurrently with the second decision table. That is, it is presented once a selection of a graph type subset has been received. In a particular embodiment, this information is presented in a section that is separate from the second decision table. In other embodiments, the information may be presented within the second decision table. Exemplary information may include a representative image and use case information for each graph type. High-level guidelines for dimension-axis assignments, ordering, color usage, clustering, hierarchy representation, and the like may also be provided.

FIG. 3 illustrates an exemplary second decision table 300 that is generated in response to a selection of a graph type subset. As described above, this second table typically includes a list of task, data, end-user, and/or representational attributes (302, 304, 306, 308), a list of graph types in the selected subset (310, 312, 314, 316), and indications of whether each graph type is appropriate in view of each attribute (e.g., 318, 320, 322, 324). In the example of FIG. 3, the attributes 302, 304, 306, 308 are phrased as statements (e.g., "Show quantities associated with one set of categories"). In alternative embodiments, the attribute may be phrased as questions (e.g., "Can show quantities associated with one set of categories?"). Additionally, the indications 203, 304, 306, 308 are represented by the phrases "YES" and "NO." In other embodiments, indications 203, 304, 306, 308 may be represented as bullets, images, or any other type of indicator.

As shown in FIG. 3, decision table 300 provides a view of the entire decision space for a given graph family. Thus, users can easily compare the suitability of different graph types for various attributes.

Figure 4:
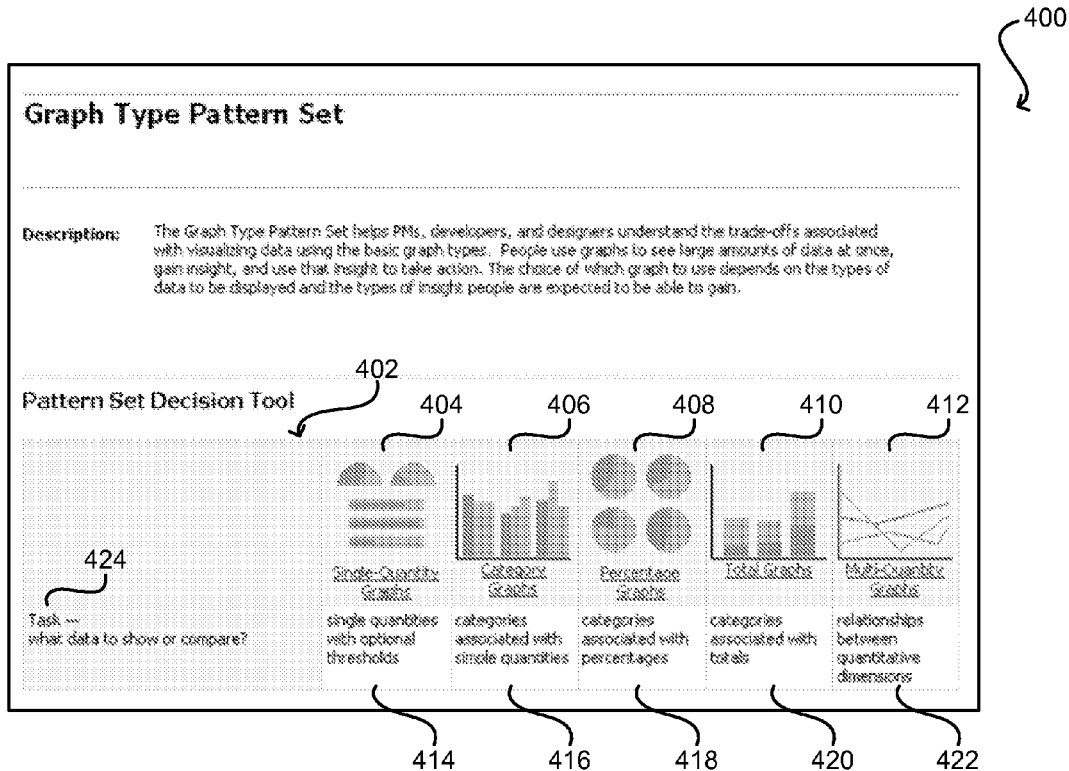
FIG. 4 illustrates a first exemplary user interface in accordance with one embodiment of the present invention.

FIG. 4 illustrates an exemplary user interface 400 in accordance with one embodiment of the present invention. User interface 400 may be implemented as a web page, proprietary application window, or any other type of software interface. User interface 400 includes a first decision table 402, which corresponds to decision table 100 of FIG. 1. Thus, decision table 402 is used to select a graph family according to a task, end-user, or data attribute. In this embodiment, graph families 404, 406, 408, 410, and 412 are represented by both a representative images and text labels. In alternative embodiments, other information, such as a brief textual description of each graph family, may be displayed. Furthermore, each graph family is selectable by a hyperlink. In other embodiments, the graph families may be selectable by a button, checkbox, or any other type of selectable user interface element.

FIG. 4 also depicts task-based attributes 414, 416, 418, 420, 422 associated with each graph family, and a corresponding question 424. In various embodiments, question 424 may be omitted.

Figure 5A:
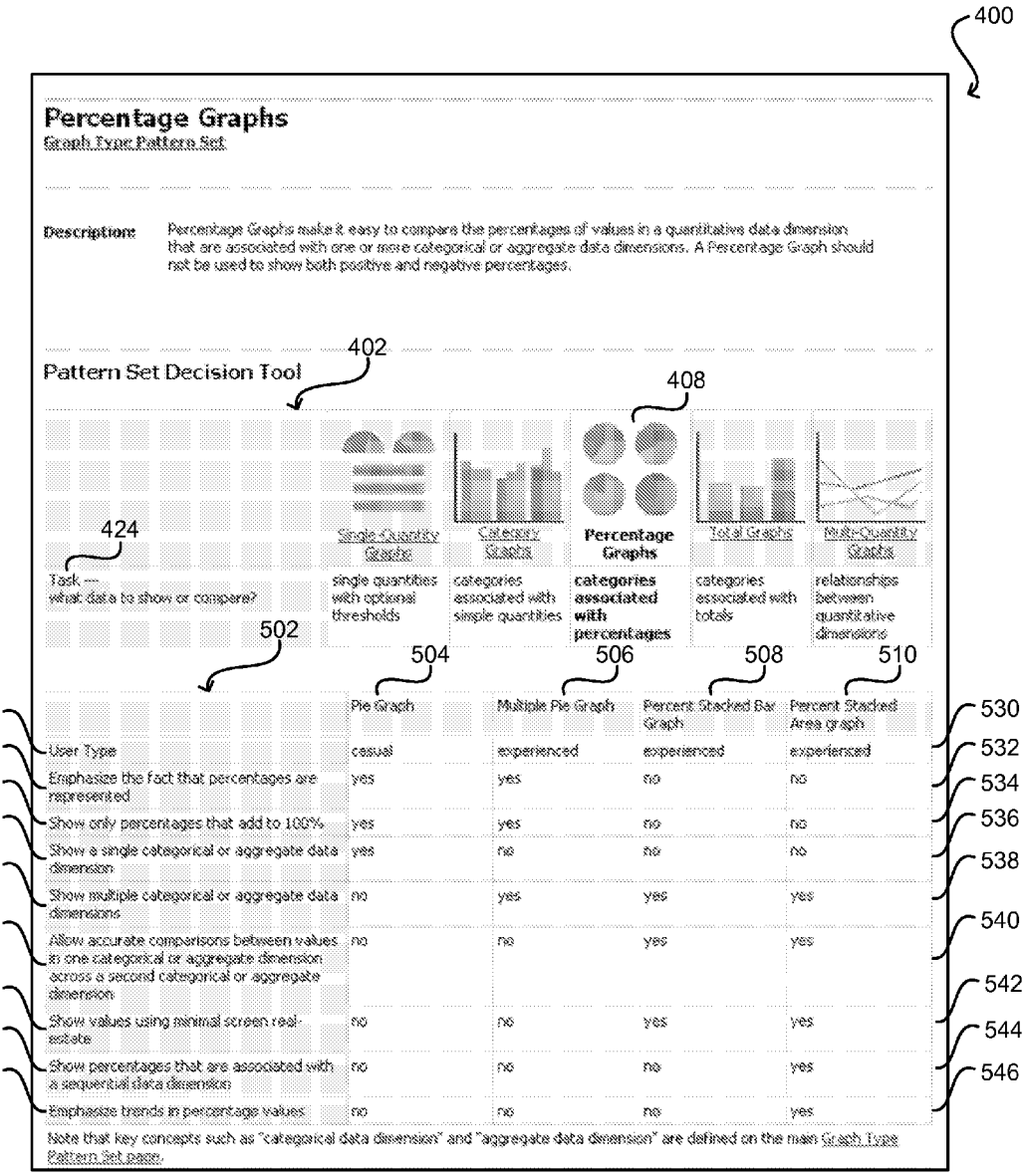
FIGS. 5A and 5B illustrate second and third exemplary user interfaces in accordance with one embodiment of the present invention.

FIG. 5A displays the visual state of user interface 400 after a graph family has been selected. In this case, the "Percentage Graphs" (408) family in table 402 has been selected and is highlighted. Additionally, user interface 400 is updated to display a second decision table 502 corresponding to the second decision table 300 of FIG. 3. Decision table 502 displays the graph types (504, 506, 508, 510) in the "Percentage Graphs" family, as well as a list of attributes (512, 514, 516, 518, 520, 522, 524, 526, 528) and responses for those attributes (e.g., 530, 532, 534, 536, 538, 540, 542, 544, 546, etc.). This information allows users to identify appropriate graph types in the "Percentage Graphs" family based on a variety of task, data, end-user, and/or representational characteristics. In various embodiments, second decision table 502 is displayed within the same user interface window as first decision table 402 to enable easy navigation between the secondary decision tables of the graph families. In other embodiments, second decision table 502 may be displayed in a second user interface window, or replace table 402 in user interface 400.

In some embodiments, the order in which attributes 512, 514, 516, 518, 520, 522, 524, 526, 528 appear in table 502 may be fixed. In other embodiments, the order may be configurable to accommodate the preferences of a particular user (or group of users). For example, one user may prefer to group all of the data-oriented attributes at the top of the table, while other users may prefer to group all of the data-oriented attributes at the bottom. In these cases, the order of attributes in table 502 would change dynamically depending on the identity of the current user.

Figure 5B:
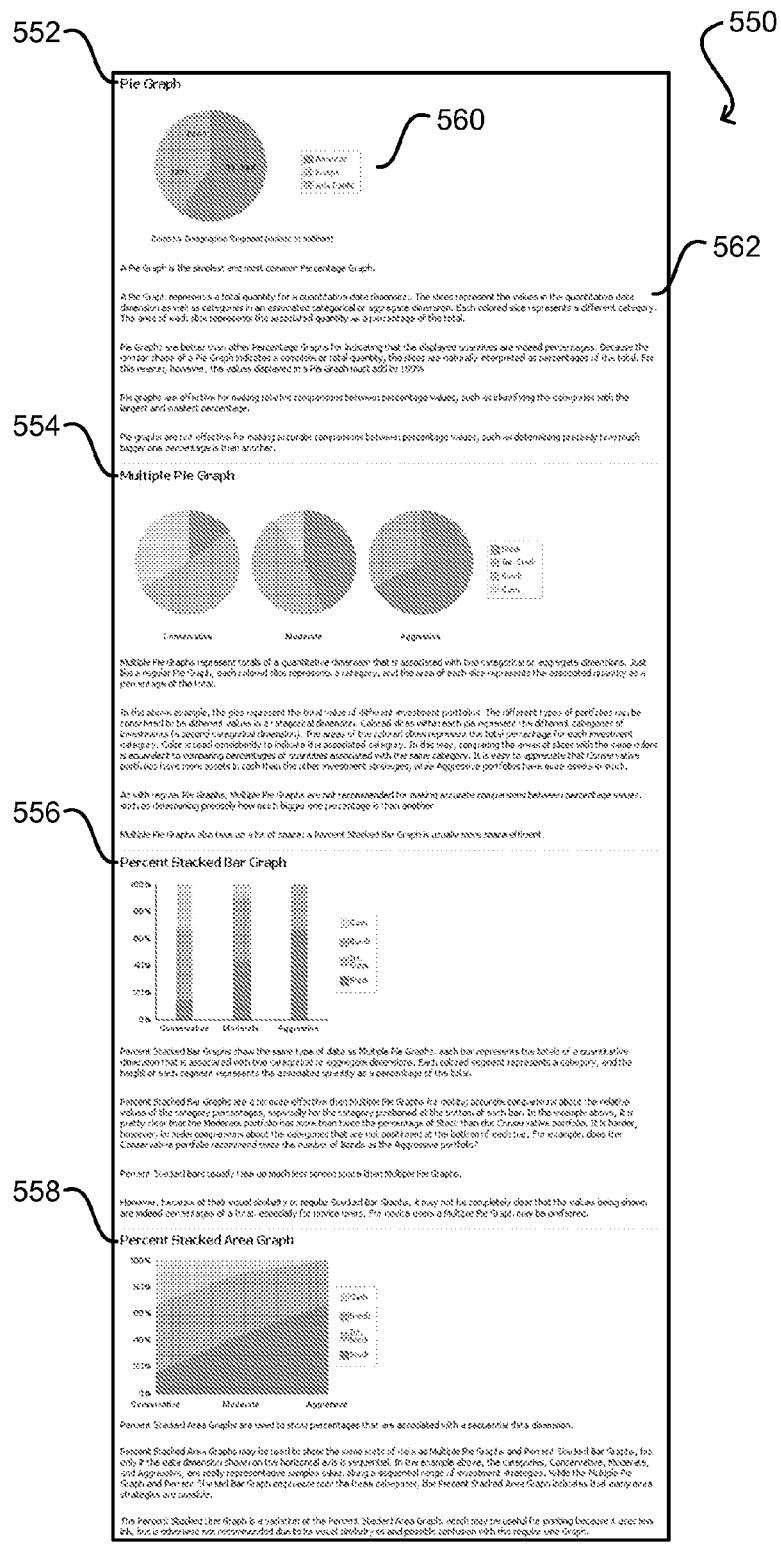

FIG. 5B illustrates another exemplary user interface 550 in accordance with one embodiment of the present invention. User interface 550 consists of one or more sections (552, 554, 556, 558), each containing detailed information about a graph type in a graph family. For example, sections 552, 554, 556, 558 contain information about the graph types in the selected "Percentage Graphs" family (408) of FIG. 5A. In the illustrated embodiment, each section includes a representative image (e.g., 560) and an detailed textual description of the graph (e.g., 562). Textual description 562 may include use case information, dimension-axis assignments, ordering guidelines, color usage guidelines, and the like.

In one embodiment, user interface 550 is presented concurrently with second decision table 502 of FIG. 5A in response to a selection of a graph family. User interface 550 may be appear in the same user interface window as user interface 500, or a different window. In another embodiment, user interface 550 (or sections thereof) may be displayed after a user has selected a particular graph type (e.g., 504, 506, 508, 510). For example, graph types 504, 506, 508, 510 may be represented by selectable user interface elements such as hyperlinks. When a user selects a graph type, information about the graph type (e.g., section 552, 554, 556, or 558 of user interface 550) can displayed to the user.

Figure 6:
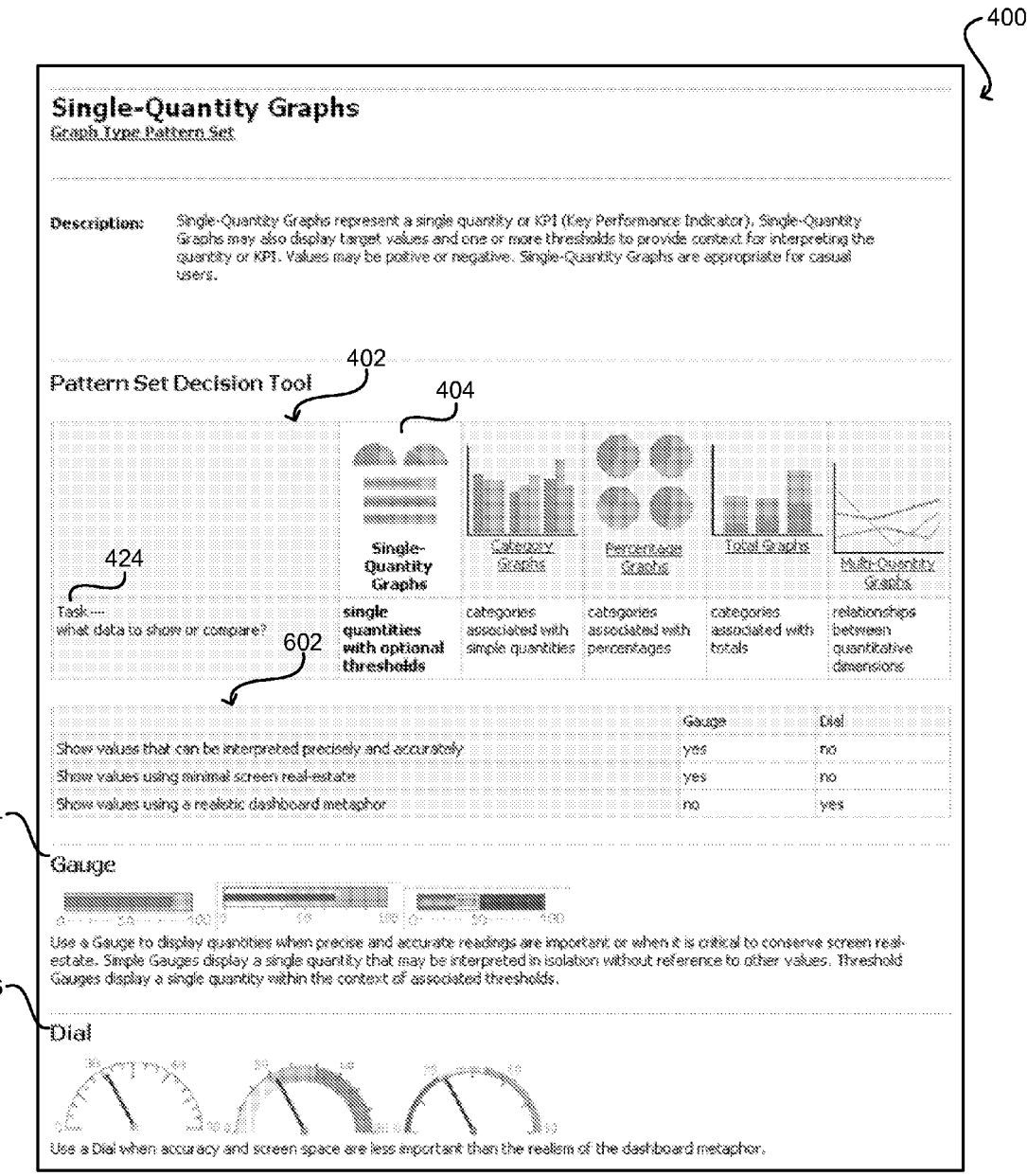
FIG. 6 illustrates a fourth exemplary user interface in accordance with one embodiment of the present invention.

FIG. 6 illustrates a version of user interface 400 in which a first decision table 402, a second decision table 602, and graph type information sections 604 and 606 are all displayed within the same user interface window.

In addition to the two-step, decision table methods described above, various embodiments of the present invention provide an automated or semi-automated approach to graph selection. In these embodiments, the underlying dataset of a potential graph is analyzed to determine one or more data attributes. The data attributes are then used to automatically filter out inappropriate graph types. In this manner, the decision space of total graph types can be pruned significantly without any user interaction.

Figure 7:
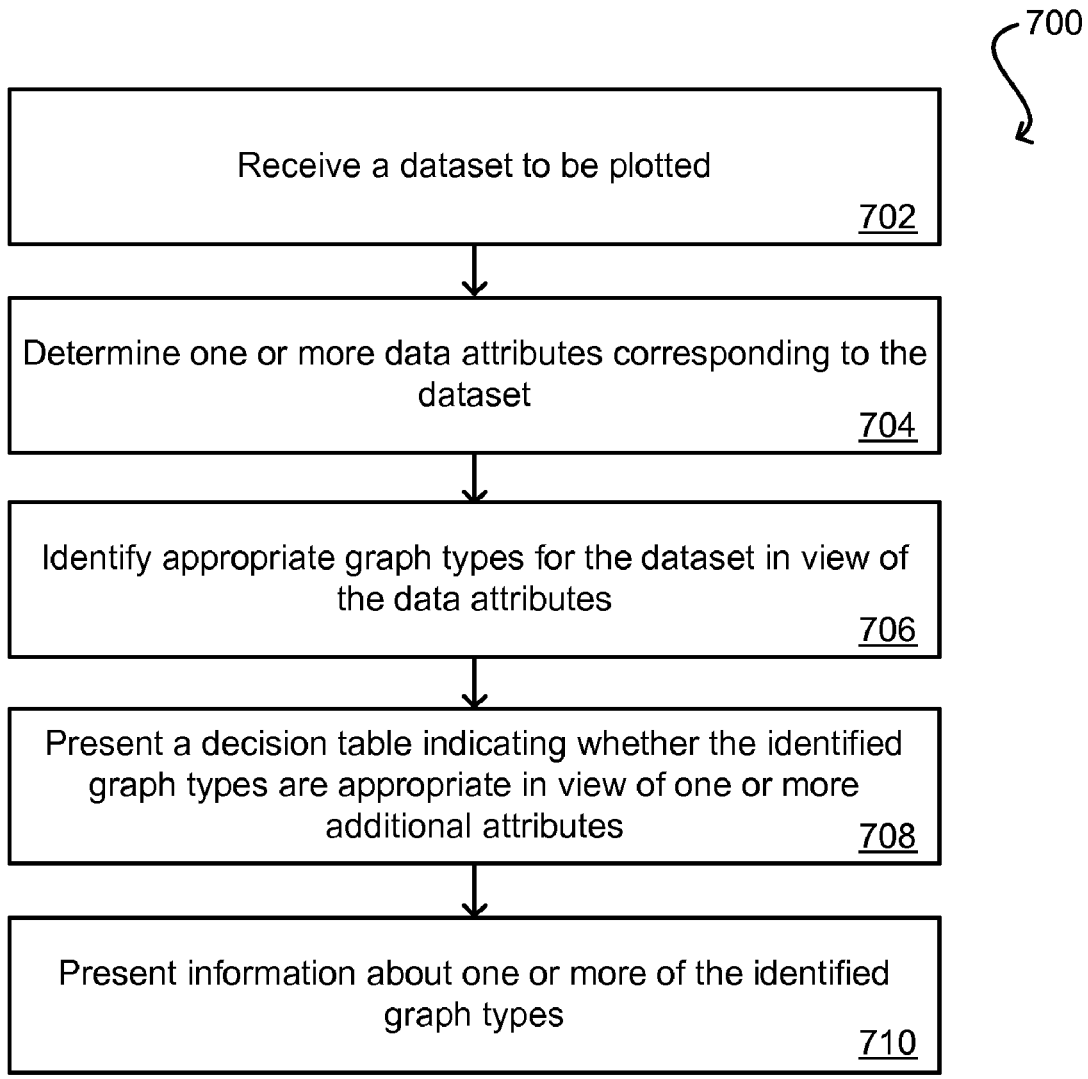
FIG. 7 illustrates the steps for a semi-automated graph selection method in accordance with one embodiment of the present invention.

FIG. 7 illustrates steps for an exemplary semi-automated graph selection method in accordance with the above. At step 702, a dataset to be plotted is received. In various embodiments, the dataset may received directly as the output of another business process or computer program, such as the results of a database query. In other embodiments, the dataset may be read from a storage location, or manually inputted by a user.

At step 704, the dataset is analyzed to determine one or more data attributes corresponding to the dataset. Such data attributes may include the number of dimensions in the dataset, the length of each dimension, the number of duplicate values in each dimension, and the type of each dimension. According to one embodiment, the type of a dataset dimension may be classified as "Quantitative" or "Categorical." A quantitative dimension is numerical or ordered, such as time. A categorical dimension has no inherent ordering, such as geographical regions or product types. In alternative embodiments, other types of dimensions are contemplated.

In various embodiments, the length of a dataset dimension may refer to the number of distinct locations to place a datapoint along the dimension. For a quantitative dimension, the length may be identified as the total number of distinct values. For a categorical dimension, the length may be identified as the total number of categories.

Figure 8:
FIG. 8 illustrates a dataset type decision table in accordance with one embodiment of the present invention.

Once the dataset is analyzed, a group of graph types that are appropriate in view of the data attributes is identified (706). In one set of embodiments, appropriate graph types may be identified according to one or more dataset type decision tables. A exemplary dataset type decision table 800 for a three-dimensional dataset is shown in FIG. 8. In table 800, graph types that are well-suited for a particular attribute are denoted by solid circles (e.g., Color Bar is recommended for showing null values). Graph types that are acceptable for a particular attribute are denoted with empty squares (e.g., Color matrix is acceptable for showing positive and negative values). Finally, graph types that are not recommended for a particular attribute show no markings (e.g., Color Scatter is not recommended for showing null values). In various embodiments, information such as that contained in dataset type table 800 may be stored in the working memory, or an accessible storage location, of a computing device to automatically determine appropriate graph types for a given set of data attributes.

If the automated process of steps 704 and 706 identify only a single graph type, the graph selection inquiry is complete. On the other hand, if the process identifies multiple appropriate graph types, those graph types may be presented to a user in a decision table similar to table 300 of FIG. 3 or table 502 of FIG. 5A (708). Using this table, the user can further prune the decision space of possible graph types according to additional task, data, end-user, and representational attributes. In various embodiments, detailed information about each graph type identified at step 706 may also be displayed (710).

One set of embodiments of the present invention may be used to replace conventional "wizards," which are typically used in spreadsheet and data analysis programs (e.g., Excel) to aid users in creating graphs. A particular embodiment may be incorporated into software development environments (e.g., JDeveloper, Microsoft Visual Studio, etc.) to help developers in selecting graph types for data visualizations that appear within their applications. Other embodiments may be implemented as a standalone application (e.g., web page, java applet, proprietary application, etc.). Additionally, embodiments of the present invention may be implemented to run as a distributed application across multiple computing devices (e.g., web-based client/server, proprietary client/server, etc.), or as a non-distributed application running on a single computing device. One of ordinary skill in the art would recognize many variations, modifications, and alternatives.

Figure 9:
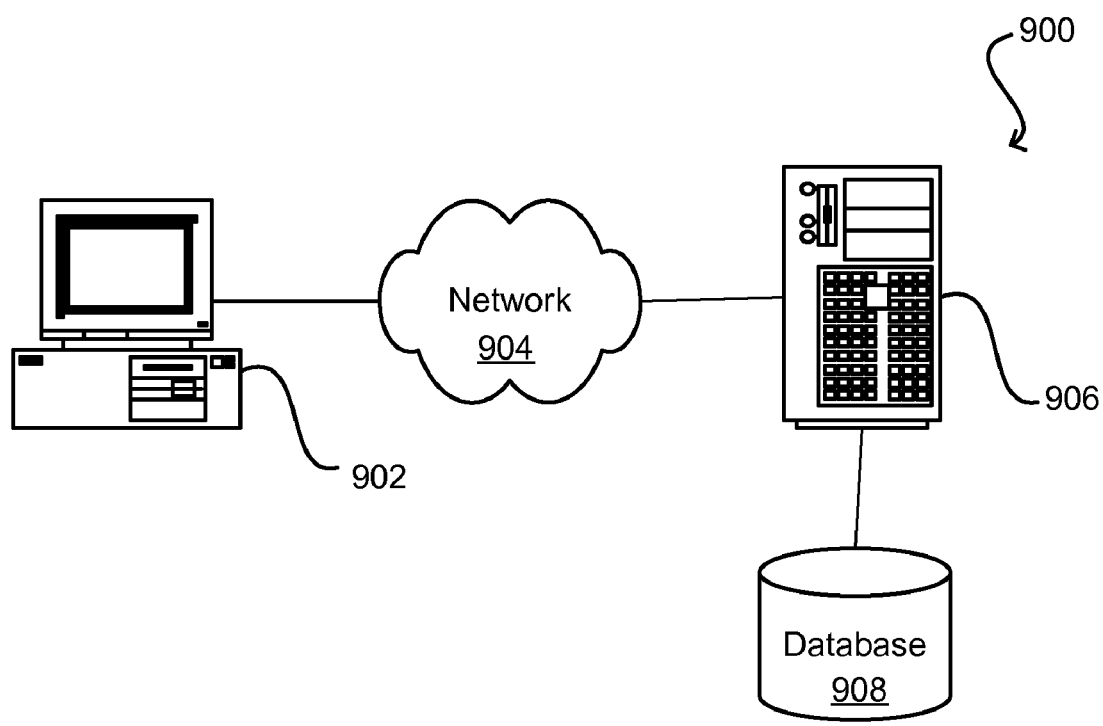
FIG. 9 illustrates an exemplary system that can be used in accordance with one embodiment of the present invention.

FIG. 9 illustrates an exemplary system in which various embodiments of the present invention may be implemented. System 900 includes a user computer 902, network 904, server computer 906, and database 908. User computer 902 may represent any type of computing device that incorporates an input component (e.g., keyboard, mouse, touch screen, etc.) and a display component (e.g., CRT or LCD monitor, etc.), such as a general purpose personal computer, cell phone, PDA, workstation computer, or the like. Server computer 906 may represent any type of server platform such as a specialized server system (e.g., PC servers, UNIX servers, mid-range servers, mainframe computers, rack-mounted servers, etc.), a server farm, a server cluster, or the like. One of ordinary skill in the art would recognize many, variations, modifications, and alternatives.

As mentioned above, some embodiments of the present invention may be implemented to run on a single computing device. Thus, user computer 902 may be configured to perform all of the steps of the graph selection methods described herein. For example, computer 902 may be configured to execute program code for generating and displaying a user interface 400 including a first decision table 402 (as shown in FIG. 4), processing a user selection of a graph type subset, and updating the user interface to display a second decision table 602 and additional information 604, 606 (as shown in FIG. 6). Computer 902 may also be configured to receive a dataset, determine one or more data attributes corresponding to the dataset, and automatically identify appropriate graph types in view of the data attributes.

Other embodiments of the present invention may be implemented to run as a distributed application across multiple computing devices. As such, user computer 902 may be configured to interact with server computer 906 and database 908 via network 904 to perform the steps of the graph selection methods described herein. According to one embodiment, server computer 908 executes the program code for generating a user interface 400 including a first decision table 402 (as shown in FIG. 4) and transmits a specification for the user interface to user computer 902. Computer 902 displays the user interface to the user and accepts input for a graph type subset selection. The selection is then transmitted to server computer 906, where code is executed to generate a second decision table 602 and additional information 604, 606 (as shown in FIG. 6). Finally, an updated specification of the user interface (reflecting second decision table 602 and information sections 604, 606) is sent to user computer 902 for display to the user. In some embodiments, the program code and data accessed by server computer 906 may be stored in an external database 908. In other embodiments, the code and/or data may be stored in any number of other local or networked storage devices such as Random Access Memory (RAM), flash memory, hard disk, optical disk, or the like. One of ordinary skill in the art would recognize many variations, modifications, and alternatives.

Figure 10:
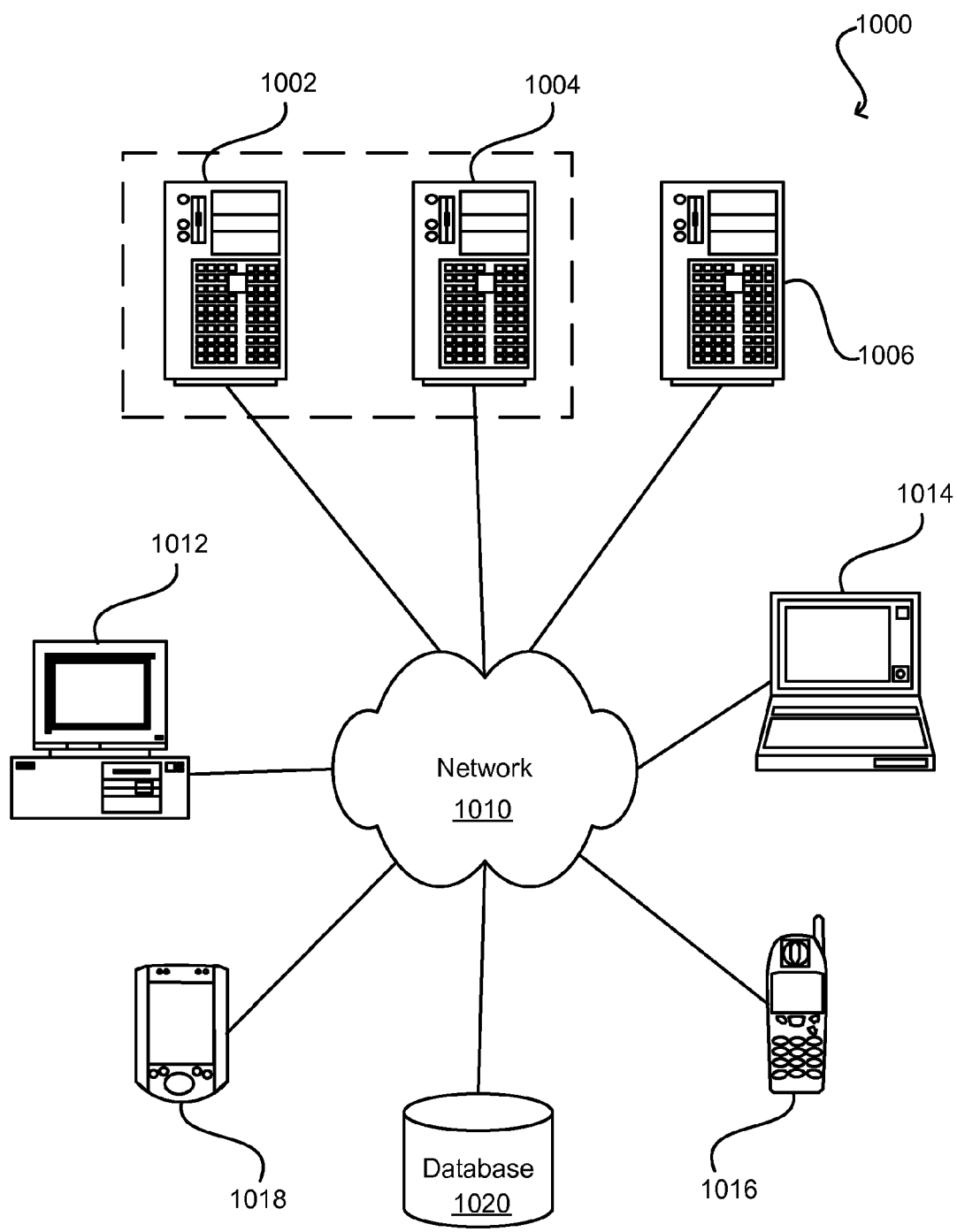
FIG. 10 illustrates components of a computer network that can be used in accordance with one embodiment of the present invention.

FIG. 10 is a block diagram illustrating components of an exemplary network environment in which various embodiments of the present invention may be implemented. The system 1000 can include one or more user computers, computing devices, or processing devices 1012, 1014, 1016, 1018, which can be used to operate a client, such as a dedicated application, web browser, etc. The user computers 1012, 1014, 1016, 1018 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1012, 1014, 1016, 1018 may also have any of a variety of applications, including one or more development systems, database client and/or server applications, and Web browser applications. Alternatively, the user computers 1012, 1014, 1016, 1018 may be any other electronic device, such as a thin-client computer, Internet-enabled gaming system, and/or personal messaging device, capable of communicating via a network (e.g., the network 1010 described below) and/or displaying and navigating Web pages or other types of electronic documents. Although the exemplary system 1000 is shown with four user computers, any number of user computers may be supported.

In most embodiments, the system 1000 includes some type of network 1010. The network may be any type of network familiar to those skilled in the art that can support data communications using any of a variety of commercially-available protocols, including without limitation TCP/IP, SNA, IPX, AppleTalk, and the like. Merely by way of example, the network 1010 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 1002, 1004, 1006 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1006) may be dedicated to running applications, such as a business application, a Web server, application server, etc. Such servers may be used to process requests from user computers 1012, 1014, 1016, 1018. The applications can also include any number of applications for controlling access to resources of the servers 1002, 1004, 1006.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1012, 1014, 1016, 1018. As one example, a server may execute a Web application such as the graph selection method of the present invention. The Web application may be implemented as one or more scripts or programs written in any programming language, such as Java, C, C# or C++, and/or any scripting language, such as Javascript, Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 1012, 1014, 1016, 1018.

The system 1000 may also include one or more databases 1020. The database(s) 1020 may reside in a variety of locations. By way of example, a database 1020 may reside on a storage medium local to (and/or resident in) one or more of the computers 1002, 1004, 1006, 1012, 1014, 1016, 1018. Alternatively, it may be remote from any or all of the computers 1002, 1004, 1006, 1012, 1014, 1016, 1018, and/or in communication (e.g., via the network 1010) with one or more of these. In a particular set of embodiments, the database 1020 may reside in a storage-area network ("SAN") familiar to those skilled in the art. Similarly, any necessary files for performing the functions attributed to the computers 1002, 1004, 1006, 1012, 1014, 1016, 1018 may be stored locally on the respective computer and/or remotely, as appropriate. In one set of embodiments, the database 1020 may be a relational database, such as Oracle 10 g, that is adapted to store, update, and retrieve data in response to SQL-formatted commands.

Figure 11:
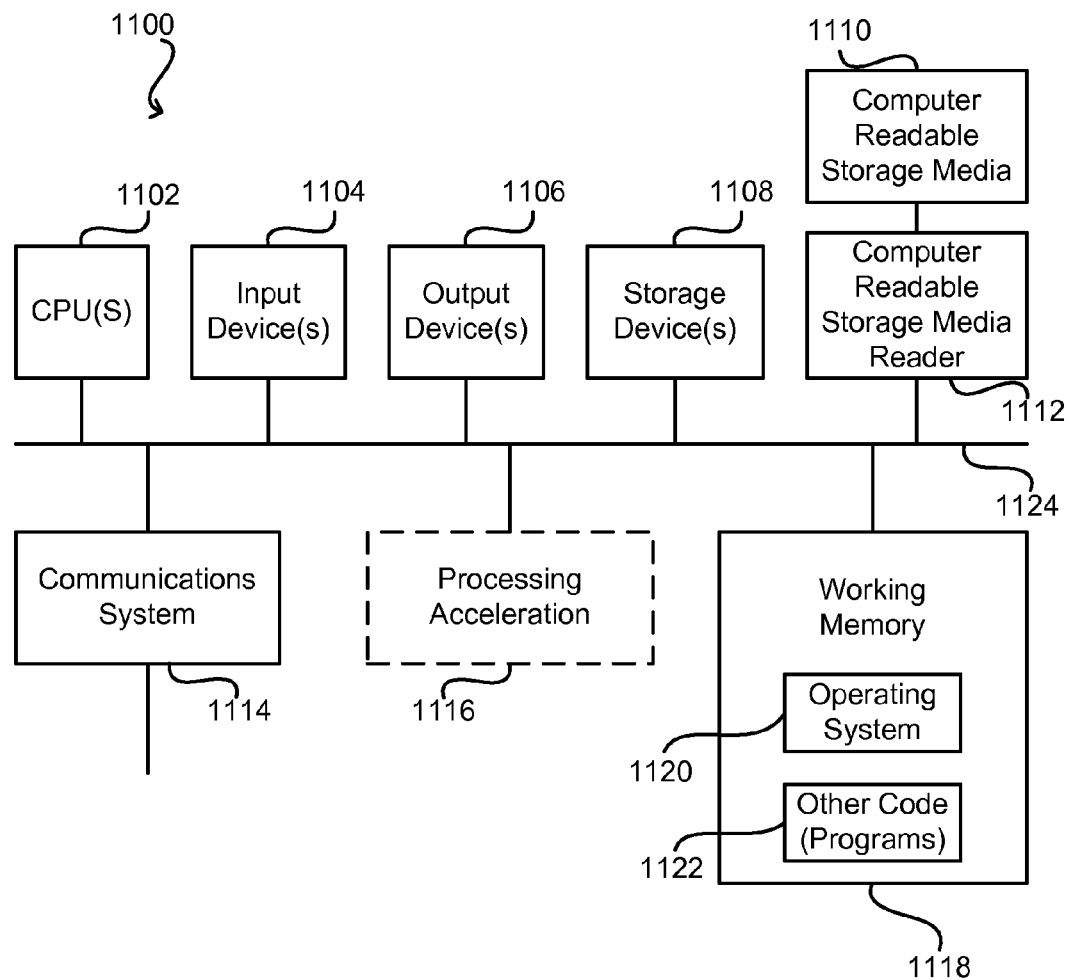
FIG. 11 illustrates components of a computerized device that can be used in accordance with one embodiment of the present invention.

FIG. 11 illustrates an exemplary computer system 1100, in which various embodiments of the present invention may be implemented. The system 1100 may be used to implement any of the computer systems described above. The computer system 1100 is shown comprising hardware elements that may be electrically coupled via a bus 1124. The hardware elements may include one or more central processing units (CPUs) 1102, one or more input devices 1104 (e.g., a mouse, a keyboard, etc.), and one or more output devices 1106 (e.g., a display device, a printer, etc.). The computer system 1100 may also include one or more storage devices 1108. By way of example, the storage device(s) 1108 can include devices such as disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1112, a communications system 1114 (e.g., a modem, a network card (wireless or wired), an infra-red communication device, etc.), and working memory 1118, which may include RAM and ROM devices as described above. In some embodiments, the computer system 1100 may also include a processing acceleration unit 1116, which can include a digital signal processor DSP, a special-purpose processor, and/or the like.

The computer-readable storage media reader 1112 can further be connected to a computer-readable storage medium 1110, together (and, optionally, in combination with storage device(s) 1108) comprehensively representing remote, local, fixed, and/or removable storage devices plus storage media for temporarily and/or more permanently containing computer-readable information. The communications system 1114 may permit data to be exchanged with the network and/or any other computer described above with respect to the system 1100.

The computer system 1100 may also comprise software elements, shown as being currently located within a working memory 1118, including an operating system 1120 and/or other code 1122, such as an application program (which may be a client application, Web browser, mid-tier application, RDBMS, etc.). It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method comprising:
   generating, by a computer system, a first user interface including a plurality of graph type subsets and, for each graph type subset, a task attribute indicating a task the graph type subset is suited for;
   receiving, by the computer system from the user, a selection of a graph type subset in the plurality of graph type subsets; and
   generating, by the computer system, a second user interface in response to the selection, the second user interface including an indication of at least one graph type in the selected graph type subset, an indication of at least one attribute, and an indication of whether the at least one graph type is appropriate in view of the at least one attribute, thereby providing guidance to the user in selecting an appropriate graph type,
   wherein the second user interface is organized as a table, the indication of the at least one graph type being presented along a first axis of the table, the indication of the at least one attribute being presented along a second axis of the table, and the indication of whether the at least one graph type is appropriate in view of the at least one attribute being presented at an intersection point between the first and second axes in the table.

2. The method of claim 1, wherein the first user interface further includes, for each graph type subset, a user attribute indicating a recommended user experience level for using graph types in the graph type subset.

3. The method of claim 1, wherein the at least one attribute is selected from a group consisting of: a data attribute corresponding to a dataset to be plotted in the graph, an end-user attribute corresponding to an intended end-user of the graph, a representational attribute corresponding to an intended visual representation of the graph, and a second task attribute corresponding to an intended use for the graph.

4. The method of claim 1, wherein the second user interface further includes information about the at least one graph type.

5. The method of claim 4, wherein the information about the at least one graph type includes a representative image of the graph type.

6. The method of claim 4, wherein the information about the at least one graph type includes use case information about the graph type.

7. The method of claim 1 further comprising:
   receiving a selection of a graph type from the user; and
   updating the second user interface to include information about the selected graph type.

8. The method of claim 1, wherein at least one graph type subset in the plurality of graph type subsets is a graph family selected from a group consisting of: single-quantity graphs, category graphs, percentage graphs, total graphs, series graphs, and multi-quantity graphs.

9. The method of claim 1, wherein the first and second user interfaces are presented in a web browser.

10. A computer-readable medium having stored thereon a series of instructions which, when executed by a processor, cause the processor to aid a user in selecting a graph type for a visualization by:
    generating, by a computer system, a first user interface including a plurality of graph type subsets and, for each graph type subset, a task attribute indicating a task the graph type subset is suited for;
    receiving from the user a selection of a graph type subset in the plurality of graph type subsets; and
    generating a second user interface in response to the selection, the second user interface including an indication of at least one graph type in the selected graph type subset, an indication of at least one attribute, and an indication of whether the at least one graph type is appropriate in view of the at least one attribute, thereby providing guidance to the user in selecting an appropriate graph type,
    wherein the second user interface is organized as a table, the indication of the at least one graph type being presented along a first axis of the table, the indication of the at least one attribute being presented along a second axis of the table, and the indication of whether the at least one graph type is appropriate in view of the at least one attribute being presented at an intersection point between the first and second axes in the table.

11. A computer system comprising:
    a memory component, the memory component operable to store data for a plurality of graph type subsets, data for a plurality of graph types, and data for a plurality of attributes; and
    a processing component, wherein the processing component is communicatively coupled to the memory component, the processing component performing a method comprising:
    generating a first user interface including a plurality of graph type subsets and, for each graph type subset, a task attribute indicating a task the graph type subset is suited for;

receiving from the user a selection of a graph type subset in the plurality of graph type subsets; and generating a second user interface in response to the selection, the second user interface including an indication of at least one graph type in the plurality of graph types, an indication of at least one attribute in the plurality of attributes, and an indication of whether the at least one graph type is appropriate in view of the at least one attribute, thereby providing guidance to the user in selecting an appropriate graph type, wherein the second user interface is organized as a table, the indication of the at least one graph type being presented along a first axis of the table, the indication of the at least one attribute being presented along a second axis of the table, and the indication of whether the at least one graph type is appropriate in view of the at least one attribute being presented at an intersection point between the first and second axes in the table.

12. A system comprising:

a data storage device operable to store data for a plurality of graph type subsets, data for a plurality of graph types, and data for a plurality of attributes; and at least one server in communication with the data storage device and operable to:

generate a first user interface including a plurality of graph type subsets and, for each graph type subset, a task attribute indicating a task the graph type subset is suited for;

receive from the user a selection of a graph type subset in the plurality of graph type subsets; and generate a second user interface in response to the selection, the second user interface including an indication of at least one graph type in the plurality of graph types, an indication of at least one attribute in the plurality of attributes, and an indication of whether the at least one graph type is appropriate in view of the at least one attribute, wherein the second user interface is organized as a table, the indication of the at least one graph type being presented along a first axis of the table, the indication of the at least one attribute being presented along a second axis of the table, and the indication of whether the at least one graph type is appropriate in view of the at least one attribute being presented at an intersection point between the first and second axes in the table.

* * * * *